(12) United States Patent
Quigley et al.

(10) Patent No.: US 9,646,306 B1
(45) Date of Patent: May 9, 2017

(54) SPLICING RESISTANT HOMOMORPHIC PASSCODE ENCRYPTION

(71) Applicant: Square, Inc., San Francisco, CA (US)

(72) Inventors: Oliver S. C. Quigley, San Francisco, CA (US); Jason Douglas Waddle, Alameda, CA (US); Benjamin Michael Adida, San Francisco, CA (US); Max Joseph Guise, San Francisco, CA (US); Dan Boneh, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 547 days.

(21) Appl. No.: 14/209,662

(22) Filed: Mar. 13, 2014

Related U.S. Application Data

(60) Provisional application No. 61/938,545, filed on Feb. 11, 2014.

(51) Int. Cl.
*G06Q 20/00* (2012.01)
*G06Q 20/40* (2012.01)

(52) U.S. Cl.
CPC ................................ *G06Q 20/4012* (2013.01)

(58) Field of Classification Search
USPC .......... 705/16, 21, 59, 71; 380/44, 262, 278, 380/279
See application file for complete search history.

(56) References Cited

U.S. PATENT DOCUMENTS

| 4,123,747 | A  | * | 10/1978 | Lancto   | G06Q 20/341 235/380 |
| 6,718,467 | B1 | * | 4/2004  | Trostle  | H04L 9/0844 380/281 |
| 6,826,281 | B1 | * | 11/2004 | Mentrup  | G09C 1/04 380/210 |
| 7,967,193 | B1 | * | 6/2011  | McGinley | G06F 21/57 235/379 |
| 9,477,822 | B1 | * | 10/2016 | Liao     | G06F 21/31 |

(Continued)

FOREIGN PATENT DOCUMENTS

| EP | 2 639 997 A1 | 9/2013 |
| WO | 2015/123216 A1 | 8/2015 |

OTHER PUBLICATIONS

U.S. Appl. No. 14/209,381, of Quigley, O.S.C., et al., filed Mar. 13, 2014.

(Continued)

*Primary Examiner* — Dante Ravetti
(74) *Attorney, Agent, or Firm* — Mattingly & Malur, PC

(57) ABSTRACT

A method for encrypting a passcode is disclosed. In one embodiment, the method includes: receiving an indication of a portion of the passcode from a user; encoding the portion of the passcode; encrypting the encoded portion into ciphertext using a homomorphic encryption system; updating a cumulative encryption string by executing a cumulative operation to aggregate the ciphertext corresponding to the encoded portion into the cumulative encryption string computed for a previous portion of the passcode, wherein the cumulative operation is dictated by a homomorphic property of the homomorphic encryption system; and generating a passcode message based at least in part on the cumulative encryption string, wherein the passcode message includes a message authentication code.

9 Claims, 9 Drawing Sheets

(56) References Cited

U.S. PATENT DOCUMENTS

2008/0304657 A1 12/2008 Tuyls et al.
2009/0327141 A1 12/2009 Rabin et al.
2013/0191650 A1 7/2013 Balakrishnan et al.
2013/0301830 A1 11/2013 Bar-El et al.

OTHER PUBLICATIONS

International Search Report and Written Opinion for PCT Application No. PCT/U52015/015259 mailed May 13, 2015.
Examination Report No. 1 for Australian Patent Application No. 2015217346, mailed Dec. 20, 2016.

* cited by examiner

SPLICING RESISTANT HOMOMORPHIC PASSCODE ENCRYPTION

CROSS-REFERENCE TO RELATED APPLICATIONS

This application claims the benefit of U.S. Provisional Patent Application No. 61/938,545, filed Feb. 11, 2014, which is incorporated by reference herein in its entirety.

BACKGROUND

A financial transaction system, as used herein, is a system that allows a merchant to use, for example, a mobile device, to accept payment for selling a product, a service, or a rental to a purchaser.

In one example, the financial transaction system includes a mobile device (e.g., a tablet computer, a smartphone, etc.) and a card reader. The card reader is in the form of an accessory and couples to the mobile electronic device (e.g., the card reader couples to the mobile device through the audio jack of the mobile device). In this example, a purchaser uses a financial transaction card (e.g., a credit card, a debit card, a pre-paid gift card, etc.) to purchase the seller's product or service by allowing his/her credit card to be swiped through the card reader. The card reader communicates the card's data to the mobile device, allowing the mobile device to confirm the authenticity of the card and further to initiate authorization of the purchase transaction. In another example, the financial transaction system may include a mobile device that accepts card-less payments from purchasers. In this example, a purchaser may convey his/her credit card information to the seller through a direct or indirect form of wireless communication with the seller's mobile device. A person of any skill in this space would easily be aware of countless other mechanisms that allow similar financial transactions to proceed in the context of such "mobile" payments.

While such mobile payment opportunities offer convenience and ease of use to both the seller and the purchaser, there are scenarios that may present new security concerns. For example, as part of the transaction flow, the purchaser may sometimes be required to enter a PIN code as an additional layer of security. Such PIN codes are required, for example, in debit card-based purchases and even in some credit card-based (e.g., Europay, MasterCard, Visa (EMV) card-based) purchases. In such scenarios, the financial transaction system needs to protect the PIN from being discovered by, for example, malware or other phishing events.

Figure 1:
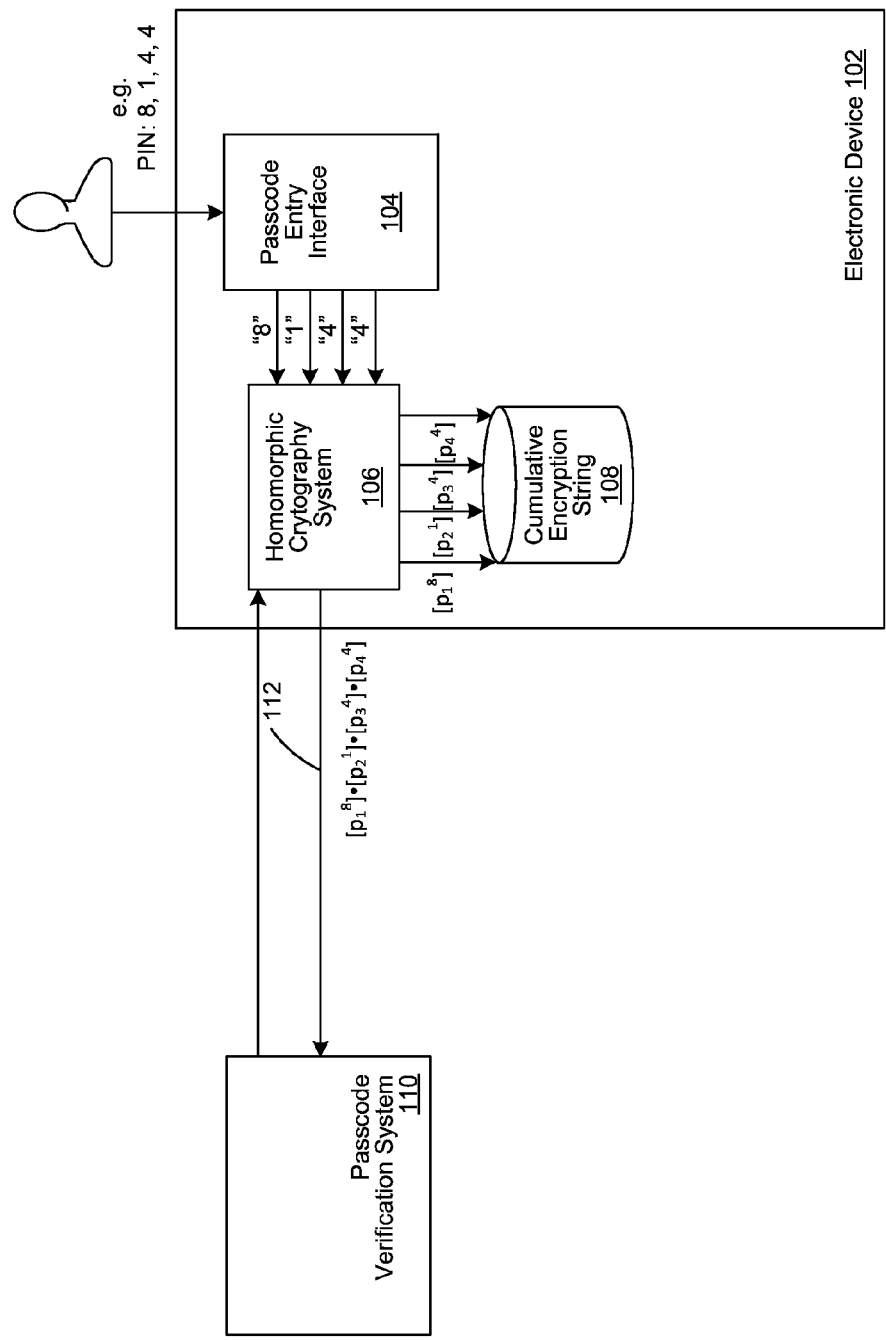
FIG. 1 is a control flow diagram illustrating a technique for encrypting a passcode utilizing homomorphic cryptography.

The figures depict various embodiments of the present invention for purposes of illustration only. One skilled in the art will readily recognize from the following discussion that alternative embodiments of the structures and the methods illustrated herein may be employed without departing from the principles of the disclosure described herein.

DETAILED DESCRIPTION

The financial transaction system described herein involves a card reader and a general-purpose electronic device, such as a mobile device or a stationary/semi-stationary system. For example, the mobile device may be a mobile phone or a tablet computer and the stationary/semi-stationary system may be a point-of-sale system or a desktop computer. The term "card reader" here refers to any object that can be used to obtain information from an object used to make an electronic payment where the object must be in the general vicinity of the object, such as an optical scanner, a near field communications device, a Bluetooth communications device, etc. The card reader may be an external device (e.g., in the form of a mobile phone accessory) that can be coupled to the general-purpose electronic device. When the card reader detects a financial transaction card (based on, for example, the card being swiped through the card reader, the card being brought in proximity to enable radio frequency (RF), Near Field Communication (NFC), or Bluetooth Low Energy (BLE) communication between the card and the card reader, etc.), the card reader retrieves card information stored on the financial transaction card to initiate a financial transaction through the general-purpose electronic device. The term financial transaction card refers to any object that can be used to make an electronic payment, such as a mobile device via a digital wallet application, an object containing an optical code such as a quick response (QR) code, etc. The financial transaction card can store financial account related data to be used in a financial transaction, such as to make a purchase. For example, the financial transaction card may be a credit card, a debit card, or an integrated circuit card in accordance with the EMV standard.

In some instances, a user (i.e., a purchaser) initiating the financial transaction may need to enter a passcode, such as a personal identification number (PIN) or a password, on a passcode entry interface to authenticate and/or authorize the financial transaction. The passcode entry interface may solicit the user to identify a sequence of symbols/digits representing the passcode. As the user enters the passcode, the electronic device can encrypt the passcode to protect against discovery of the passcode by a malicious third party.

One security consideration in designing a passcode entry system is whether a memory snapshot of the passcode entry device can compromise the passcode entered by the user. The disclosed technique involves a method of encrypting portions (e.g., characters, digits or alphabets) of the passcode entered by the user separately, and accumulating the encrypted portions into a cumulative encryption string (e.g., a single encrypted digital string). Hence, the disclosed technique protects the data flow through the memory of the passcode entry device such that any given memory snapshot can reveal at most a single portion (e.g., a character, a digit, or an alphabet) of the passcode.

The cumulative encryption string can be represented as a tuple, including a cumulative nonce product and a cumulative message string. The cumulative encryption string can be decrypted with a single set of decryption keys. That is, the decryption process needs only be run once to derive the unencrypted plaintext, even though the cumulative encryption string embodies multiple encrypted portions. The electronic device can capture a sequence of user inputs indicative of a sequence of symbols representing the passcode via an input component, such as buttons or a touchscreen. The card reader or an external server coupled to the electronic device can then authenticate and/or authorize the financial transaction by verifying the passcode entered by the user. Conventionally, as a user (e.g., purchaser) enters the passcode, an unencrypted digital representation of the entire passcode may sometimes have to be stored on a memory device(s) of the electronic device. The disclosed technique, instead, encrypts each portion of the passcode separately to prevent discovery of the entire passcode by malicious entities. The electronic device can encrypt each portion of the passcode as the portion is entered or determined, such that no memory device of the electronic device ever stores the entire unencrypted passcode.

A challenge associated with encrypting multiple portions of a passcode is that delivery of multiple encrypted files puts a burden on the network used for delivery. Further, decryption of the multiple encrypted files is memory and processor intensive and thus may necessitate more memory and computing resources at the receiving device. The disclosed technique overcomes these challenges by encrypting each portion (e.g., a symbol or digit) of the passcode using a homomorphic cryptosystem and aggregating the encrypted portions into a master encryption file (i.e., the cumulative encryption string). The cumulative encryption string includes only a single layer of encryption despite including multiple separately encrypted portions. The electronic device can utilize the homomorphic property of the homomorphic cryptosystem to combine multiple encrypted portions into a final cumulative encryption string, thus reducing the burden on the network and the receiver-side memory and processor. The disclosed technique enables a single encrypted file to be sent from the electronic device to the card reader without having to send multiple encryption files for each symbol/digit of the passcode. Further, the electronic device can encrypt each individual symbol/digit as the user enters the symbol/digit, thus preventing discovery of the passcode by a malicious third party.

Homomorphic encryption is a form of encryption that allows specific type(s) of computational operation(s) to be carried out on ciphertexts (i.e., results of encryption) and obtain an encrypted result which, when decrypted, matches the result of the same computational operation(s) performed on the plaintext (i.e., inputs to the encryption). The specific type of computational operation may be referred to as the homomorphic property of the homomorphic cryptosystem. A homomorphic encryption scheme may preserve the homomorphic property for only multiplication, only addition, or for both addition and multiplication. For example, the unpadded RSA and the ElGamal are cryptosystems that preserve the homomorphic property for multiplication. A cryptosystem refers to a suite of mechanisms/processes for implementing a particular form of encryption and decryption, including, for example, a key generation mechanism, an encryption mechanism, and a decryption mechanism.

In at least one embodiment, the electronic device may implement a homomorphic encryption process, such as according to the ElGamal cryptosystem, that preserves the homomorphic property for multiplication. Under the ElGamal cryptosystem, in a group G, if the public key is (G, q, g, h), where $h=g^x$, x is the private key, and r is a random variable selected from the set $\{0, \ldots, q-1\}$, then the encryption of a message m is $\epsilon(m)=(g^r, m \cdot h^r)$. The homomorphic property can be illustrated as $\epsilon(m_1) \cdot \epsilon(m_2) = (g^{r_1}, m_1 \cdot h^{r_1})(g^{r_2}, m_2 \cdot h^{r_2}) = (g^{r_1+r_2}, m_1 \cdot m_2 \cdot h^{r_1+r_2}) = \epsilon(m_1 \cdot m_2)$.

The electronic device can encode each portion (e.g., a symbol or digit) of the passcode as a plaintext value, before encrypting the plaintext value into ciphertext. For example, the electronic device can encrypt a plaintext value calculated based in part on a numeric representation of each symbol/digit with the ElGamal cryptosystem. As a specific example, the plaintext value can be a prime number raised to the power of the digit or to the power of a numeric representation of the symbol. Each ciphertext outputted by the cryptosystem is multiplied together with a cumulative encryption string that is the product of all previous ciphertexts produced from the previous symbols or digits. This product is then updated as the new cumulative encryption string. In this manner, instead of producing a sequence of ciphertexts (e.g., $\epsilon(m_1)$, $\epsilon(m_2)$, . . . ) from a sequence of symbols or digits, the electronic device only has to upkeep a cumulative master encryption string (e.g., $\epsilon(m_1) \cdot \epsilon(m_2) \cdot \epsilon(m_3) \cdot \ldots$). Because of the homomorphic property of the ElGamal cryptosystem, this cumulative encryption string is identical to the ciphertext resulting from encrypting the product of the plaintext values associated with each symbol or digit, e.g., $\epsilon(m_1 \cdot m_2 \cdot m_3 \cdot \ldots)$.

The disclosed technique can encode the portions of the passcode as powers on small primes. In particular, if the passcode (e.g., represented as a sequence of digits) is denoted by a vector $d=[d_1, d_2, \ldots, d_M]$, then the encoded portions may be denoted as $EPs=[p_1^{d_1}, p_2^{d_2}, \ldots, p_M^{d_M}]$, where the $p_i$ denotes a set of prime bases and M denotes the number of portions in the passcode. The set of prime bases can be chosen in accordance with various security restrictions. For example, the set of prime bases may include small primes for ease of calculation.

The set of prime bases may be chosen for semantic security. For example, under embodiments utilizing the ElGamal cryptosystem or other similar cryptosystems, the prime bases can be chosen to have order q instead of 2q. Here, "q" denotes the public encryption parameter for the ElGamal cryptosystem. Under the ElGamal cryptosystem, the modulus N used for the encryption mechanism is equal to 2q+1. An order (n) of a prime basis (p) is the number of elements in a cyclic group of modulo N for exponents of the prime basis. That is, the order is the smallest number n such that $p^n=e$, where "e" denotes the identity element in the cyclic group. For example, using "2" as one of the prime bases for encoding may lead to a leak of information about the associated passcode portion. A malicious third party can observe that the order of the resulting encoding depends on the parity of the exponent. Exploiting the Legendre symbol of the message, the malicious third party can reverse-engineer the parity of the passcode portion. If the passcode portion is a digit, the malicious third party can determine the parity of the digit through this exploit. To combat this issue, the set of prime bases can be chosen to have order q. That is, every prime number in the set satisfies $p_i^q \equiv 1$ (mod N). This holds, for example, for the small prime "3" and many other prime numbers.

The set of prime bases can be chosen by an external server system along with other static cryptography parameters of the homomorphic cryptosystem that are accessible by both the encryption-side device (e.g., the electronic device) and the decryption-side device (e.g., the card reader). The set of prime bases can be stored in a static file maintained by the external server system. Alternatively, multiple sets of potential prime bases may be associated with particular decryption side devices, such as by hardware identifications of such devices. In either case, the electronic device can receive the set of prime bases and/or the public key for encryption by requesting such parameters from the external server system. Alternatively, the set of prime bases and/or the public key may be part of a mobile application downloaded and installed onto the electronic device.

It is noted that whilst portions of the passcode that are encoded and encrypted have been illustrated as individual symbols or digits of the passcode, the portions may be partitioned in other ways as well. For example, the portions can be pairs of symbols or digits. The portions can further be values indicative of the symbols/digits that represent the passcode. For example, where the passcode is determined based on touch events on the passcode entry interface, the electronic device can encode and encrypt the (X,Y) coordinates of each touch separately. In some embodiments, the electronic device can encrypt the portions directly without first encoding the portions or values indicative of the portions.

After the cumulative encryption string captures every portion of the passcode entered by the user, the electronic device generates a message based at least in part on the cumulative encryption string to verify the passcode. To further the security of the encrypted message, the electronic device can add a message authentication code in the encrypted message for verifying the data integrity and the authenticity of the message. The message authentication code provides splicing resistance to safeguard the passcode. For example, the electronic device can generate the message authentication code from an encryption-side random nonce. The random nonce is not individually sent over as part of the message, but rather, the random nonce is encrypted together with the cumulative encryption string. In this manner, the message authentication code can only be verified when the random nonce is back-solved through a successful decryption of the message.

For example, under the ElGamal cryptosystem, the cumulative encryption string is represented as the tuple, $\{B_M, C_M\}$, where $B_M = g^{\Sigma r_i}$ and $C_M = \pi(p_i^{d_i}) \cdot g^{x \cdot \Sigma r_i}$, where $r_i$ are random nonce generated for each portion of the passcode. The second component of the tuple can be modified by multiplying with a multiplier (T) calculated based partly on the encryption-side random nonce (t), i.e., $C_M' = T \times C_M$. For example, the multiplier can be one plus the product of the encryption-side random nonce and the prime numbers used to encode the passcode portions, i.e., $T = t \cdot \pi(p_i) + 1$. The encrypted message can include the first component of the tuple, the modified second component of the tuple, and a splicing resistance factor (SR), where $SR = HMAC_K$ and $K = SHA256(t, B_M, C_M', g^x)$. Here, the splicing resistance factor serves as the message authentication code described above.

The electronic device can then send the encrypted message to the card reader or an external server to verify the passcode. The card reader or the external server can access a decryption key consistent with the encryption key used in the homomorphic cryptosystem implemented on the electronic device. The card reader or the external server can decrypt the cumulative encryption string to determine the product of the encoded portions of the passcode entered by the user.

The card reader or the external server can verify the user passcode entry against an authentic passcode in the financial transaction card in various manners. For example, the card reader can access the financial transaction card via a read head to determine the authentic passcode associated with the purchaser's financial account. The card reader or the external server can factor the encoded portions of the passcode (e.g., using the set of prime numbers that is used to encode) to determine the passcode entry and use the passcode entry to verify against the authentic passcode. As another example, the card reader can send the decrypted and decoded user passcode entry to the financial transaction card for verification against the authentic passcode.

In other embodiments, the card reader or the external server can calculate a comparison value based at least in part on the authentic passcode to verify the passcode. For example, the comparison value can be a product of prime numbers, each raised to the power of respective digits in the authentic passcode. The prime numbers used here are the same prime numbers used to calculate the plaintext values (i.e., the encoded portions) during the encryption process. In this way, the card reader or the external server can compare the comparison value against the decrypted cumulative encryption string. When both values match or when both values maintain an equivalent mathematical property, the card reader or the external server can authorize and authenticate the financial transaction.

FIG. 1 is a control flow diagram illustrating a technique for encrypting a passcode utilizing homomorphic cryptography. A user can enter a passcode on an electronic device 102, such as the PIN digits "8144" as shown. The electronic device 102 may be a general-purpose electronic device, such as a mobile device or a stationary device. The electronic device 102 may include and execute a general-purpose operating system capable of running one or more third-party applications that may be downloaded, installed, and executed on the electronic device 102.

For example, the electronic device 102 provides a passcode entry interface 104 to enable the user to identify a sequence of symbols representing the passcode. The sequence of symbols may include numeric digits, alphabetical characters, alphanumeric characters, pictograms, icons, other types of enumeration, or any combination thereof. Each symbol can have a numeric representation, such as a binary representation, that can be used for encryption.

The passcode entry interface 104 may be implemented as a user interface displayed on a touchscreen. The electronic device 102 generates and displays the passcode entry interface 104 when the electronic device 102 needs to authenticate a financial transaction or other types of user operations. Alternatively, the passcode entry interface 104 may instead be implemented with a set of physical buttons.

As the user enters the passcode, the electronic device 102 can separately encrypt portions of the passcode utilizing a homomorphic cryptography system 106. The homomorphic cryptography system 106 is a processing module of the electronic device 102 capable of encrypting datasets into ciphertexts according to a homomorphic cryptosystem, such as the ElGamal cryptosystem. The ciphertexts generated by the homomorphic cryptography system 106 maintain a homomorphic property. The homomorphic cryptography system 106 may be implemented as an application specific integrated circuit or as instructions executable by a processor.

The portions to encrypt can correspond to the individual symbols that make up the passcode. The portions can also correspond to subsets of the symbols. Alternatively, the portions to encrypt can be datasets that are used, at least partially, to determine the individual symbols. For example, the portions can be locations on the passcode entry interface where a touch event has been detected. The electronic device 102 can encrypt each portion whenever each portion is determined. For example, the encryption of a portion can occur in response to identifying a symbol entered by the user or to detecting a touch event on the passcode entry interface 104.

In some embodiments, the electronic device 102 can first encode each portion into a plaintext value and then encrypt the plaintext value corresponding to such portion. For example, the electronic device 102 calculates the plaintext value based at least partly on raising the power of a prime number to a numeric value of the portion (i.e., multiplying the prime number for a number of times equal to the numeric value of the portion). In the example shown in FIG. 1, the ciphertexts of the encoded plaintext values are $[p_1^8]$, $[p_2^1]$, $[p_3^4]$, and $[p_4^4]$, wherein the bracket denotes the encryption and "$p_i$" denotes the prime number used for each sequential position of the encoded portions (i.e., "$p_1$" being the prime number used for the first portion and "$p_2$" being the prime number used for the second portion).

For each portion, the electronic device 102 encrypts the encoded plaintext and aggregates the resulting ciphertext into a cumulative encryption string 108. The cumulative encryption string 108 is a ciphertext file, which aggregates all previously generated ciphertexts corresponding to previously encrypted portions of the passcode. How the electronic device 102 aggregates the ciphertexts depends on the homomorphic property of the homomorphic cryptography system 106. For example, if the homomorphic property preserves multiplication, the ciphertexts are aggregated as a product; and if the homomorphic property preserves addition, the ciphertexts are aggregated as a summation. As each new ciphertext is generated, the homomorphic cryptography system 106 updates the cumulative encryption string 108 by multiplying or adding the previous instance of the cumulative encryption string 108 with the new ciphertext.

The passcode entry interface 104 and the homomorphic cryptography system 106 may both be part of a mobile application (commonly referred to as an "app") that is downloaded and installed onto the electronic device 102. The mobile application is stored in a memory device (not shown), such as a volatile or a non-volatile storage medium, and can be executed by a processor (not shown) of the electronic device 102.

After the user enters the entire passcode, the homomorphic cryptography system 106 would have aggregated ciphertexts corresponding to every portion or encoded portion of the passcode into the final cumulative encryption string 108. The electronic device 102 can then send the final cumulative encryption string 108 to a passcode verification system 110 in a message 112. The passcode verification system 110 is a device capable of verifying the authenticity of the passcode entered by the user (henceforth referred to as the "passcode entry"). The passcode verification system 110 has access to an authentic version of the passcode (henceforth referred to as the "authentic passcode"). The passcode verification system 110 can use the authentic passcode to verify the passcode entry.

In some embodiments, the passcode entry and the passcode encryption processes are initiated by the passcode verification system 110. For example, the passcode verification system 110 may be a card reader coupled to the electronic device 102. The card reader can initiate a financial transaction upon detecting a swipe of a payment card, such as a credit card, a debit card, an EMV card (a payment card in accordance with the EMV standard), etc. The card reader can send the card information of the payment card to the electronic device 102. The electronic device 102 can then try to authenticate the financial transaction by requesting the user to enter the passcode through the passcode entry interface 104.

The passcode verification system 110 extracts the cumulative encryption string 108 from the message 112 and decrypts the cumulative encryption string 108 to determine an accumulated value indicative of a sequence of symbols that represents the passcode entered by the user.

In some embodiments, the accumulated value can uniquely identify the passcode entry. To verify the passcode entry, the passcode verification system 110 can calculate a comparison value based on the authentic passcode associated with the financial transaction card in the same manner that the accumulated value is calculated. That is, the passcode verification system 110 can encode portions of the authentic passcode in the same encoding process as the portions of the passcode entry, and can accumulate the encoded portions of the authentic passcode using the same cumulative operation based on the homomorphic property of the homomorphic cryptography system 106.

For example, the passcode verification system 110 can calculate the comparison value by taking the powers of the same prime numbers used by the homomorphic cryptosystem 106 to the numeric digits of the authentic passcode. The passcode verification system 110 can then verify the passcode entry by comparing whether the accumulated value and the comparison value match each other. In other embodiments, the passcode verification system 110 can determine the passcode entry from the accumulated value (e.g., by decrypting and decoding the accumulated value as described in disclosure), and verify the determined passcode entry against the known authentic passcode in the financial transaction card.

Figure 2:
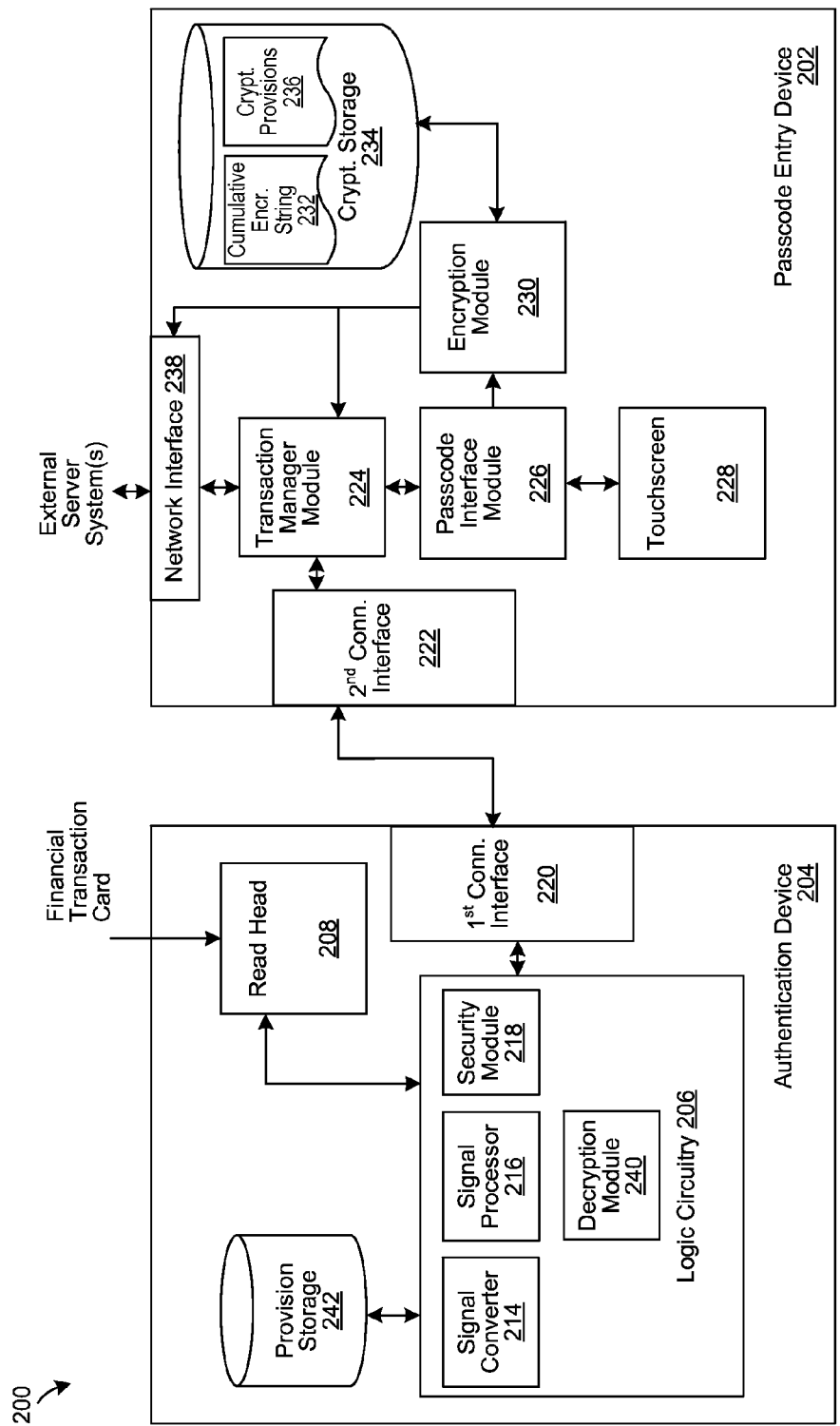
FIG. 2 is a block diagram illustrating an example of a passcode verification system including a passcode entry device and an authentication device.

FIG. 2 is a block diagram illustrating an example of a passcode verification system 200 including a passcode entry device 202 and an authentication device 204. The passcode verification system 200 may be consistent with various other embodiments described in this disclosure. The passcode entry device 202 is illustrated as a mobile device with a touchscreen, but may be implemented as another type of electronic device with computing capabilities. For example, the passcode entry device 202 may be the electronic device 102 of FIG. 1. The authentication device 204 is illustrated as a card reader, but may be implemented also as another type of electronic device with computing capabilities. For example, the authentication device 204 may be the passcode verification system 110 of FIG. 1.

The authentication device 204 includes logic circuitry 206. The logic circuitry 206 controls and executes processes operated by the authentication device 204. The logic circuitry 206 may comprise one or more of an application-specific integrated circuit (ASIC), field programmable gate array (FPGA), a controller, a microprocessor, and other types of digital and/or analog circuitry.

The logic circuitry 206 can communicate with a read head 208. The read head 208 can detect a financial transaction card, such as detecting the card being swiped or the card entering the proximity of the read head 208 (e.g., via RF or BLE). The read head 208 may be a magnetic strip reader, an NFC smart card, a radiofrequency identification (RFID) reader, a Bluetooth reader, a radio frequency receiver, an optical reader, or any combination thereof.

In various embodiments, the logic circuitry 206 may include a signal converter 214, a signal processor 216, and a security module 218 to facilitate communication with the read head 208. The signal converter 214 is circuitry that converts analog readings from the read head 208 into digital data. The signal processor 216 is circuitry for processing and interpreting the digital data from the signal converter 214 into card information, representative of financial account information of a user. Optionally, the logic circuitry 206 may include the security module 218 to encrypt and/or decrypt information to and from the financial transaction card or otherwise provide secure access to a financial transaction card via the read head 208.

The logic circuitry 206 can communicate with the passcode entry device 202 via a first connection interface 220. The first connection interface 220 is adapted to communicate with the passcode entry device 202, such as via a wired connection (e.g., an audio cable or a bus) or wirelessly (e.g., RF or Bluetooth communication). The logic circuitry 206 can initiate a financial transaction with the passcode entry device 202 through the first connection interface 220 when the read head 208 detects the financial transaction card. The logic circuitry 206 can send a message to the passcode entry device 202 through the first connection interface 220 to initiate a process to authenticate and authorize the financial transaction. In some embodiments, the message can cause the electronic device to generate and display a passcode interface.

The passcode entry device 202 includes a second connection interface 222 that couples to the first connection interface 220 of the authentication device 204 directly or indirectly, including via a wired connection or a wireless connection. The passcode entry device 202 includes a transaction manager module 224 to facilitate authorization of the financial transaction. The transaction manager module 224 can manage identity of goods, services, and/or rentals associated with the financial transaction. The transaction manager module 224 can process messages received via the second connection interface 222, including the message to initiate the process to authenticate the financial transaction. The transaction manager module 224 can notify a passcode interface module 226 to solicit a user to enter a passcode in response to the message. For example, the passcode interface module 226 can generate and display a passcode entry interface on a touchscreen 228. The passcode entry interface may include buttons labeled with symbols (e.g., digits, characters, icons, etc.) that the user may interact with to indicate a sequence of symbols representing the passcode. The passcode interface module 226 monitors the touchscreen 228 and records locations of any "touch" events to determine the sequence of symbols.

The passcode entry device 202 includes an encryption module 230 to implement a piecemeal encryption of portions of the passcode using a homomorphic cryptosystem. The encryption module 230 can encrypt the portions sequentially as the user enters each portion. For example, each portion can correspond to a touch event or a set of touch events from the user. Each portion can also correspond to a symbol in the passcode entry.

In some embodiments, the encryption module 230 can encode each portion of the passcode as a plaintext value. That is, as each portion is identified, the encryption module 230 can calculate the plaintext value based at least partly on the identified portion and encrypt the plaintext value into ciphertext utilizing a homomorphic cryptosystem, such as with the ElGamal asymmetric encryption. In one example, the plaintext values may just be numeric representations ($d_i$) of the symbols of the passcode. Alternatively, a hash function or an encoding process can be used to determine the plaintext value from the numeric representation of each portion. For example, the encryption module 230 can calculate the plaintext value for each symbol by selecting a prime number from a set of prime bases ($p_i$) and calculating the plaintext value by raising the small prime to the power represented by the numeric representation of the symbol. In this example, the plaintext is equal to $p_i^{d-1}$. The encryption module 230 can select the small prime based at least in part on a sequential counter of the symbol entered, such as selecting $p_1$ for the first portion entered by the user and selecting $p_2$ for the second portion entered by the user.

The encryption module 230 then "accumulates" the ciphertexts generated for the portions into a cumulative encryption string 232 by means of a cumulative operation, e.g., the cumulative encryption string 232 including a summation or product of the ciphertexts. For example, the cumulative operation can be a running product, where each ciphertext is multiplied together to form the cumulative encryption string 232. In some embodiments, the ciphertexts are multiplied together when all portions of the passcode is entered by the user. In other embodiments, the encryption module 230 iteratively updates the cumulative encryption string 232 to include each newly calculated ciphertext in its cumulative product. The cumulative encryption string 232 can be stored in a cryptography storage 234. In some embodiments, the ciphertexts of each portion is deleted from the memory of the passcode entry device 202 after the ciphertext is "accumulated" into the cumulative encryption string 232.

Cryptography provisions 236 may be required to implement the homomorphic cryptosystem, particularly for the encryption module 230. The cryptography provisions 236 may include, for example, an encryption key (e.g., a public key), a set of prime bases, a modulus, a generator, other static parameters or random variables, or any combination thereof. Some or all of the provisions/parameters may be associated with a hardware identification data of the authentication device 204 (i.e., where decryption occurs). The encryption module 230 can receive the hardware identification data (henceforth referred to as "hardware ID") from the authentication device 204, such as when the authentication device 204 first connects with the passcode entry device 202. Subsequently, the hardware ID may be used to query an external server system, via a network interface 238, for some or all of the cryptography provisions 236. Alternatively, the encryption module 230 can receive some of the cryptography provisions 236, such as the public key for encryption, directly from the authentication device 204. The cryptography provisions 236 may be stored in the cryptography storage 234 as well or another memory device of the passcode entry device 202. In some embodiments, an association between each set of the cryptography provisions 236 (e.g., the public key) and the hardware ID of a corresponding device for decryption can be stored in the cryptography storage 234. Accessing that association enables the encryption module 230 to select the correct set of provisions corresponding to the intended destination of the cumulative encryption string 232, such as using the public key that matches the private key used for decryption at the intended destination.

Other examples of the cryptography provisions 236 may be necessary to implement the homomorphic encryption, such as the ElGamal cryptosystem, including a modulus (henceforth referred to as "N"), a generator (henceforth referred to as "g"), and the set of prime bases $p_i$. These parameters may be provisioned as part of a mobile application that is downloaded and installed on the passcode entry device 202. Alternatively, these parameters may be requested from an external server system or be part of a factory setting of the passcode entry device 202.

In some embodiments, to verify the authenticity of the passcode entry, the transaction manager module 224 transmits a message containing the cumulative encryption string 232 indicative of the passcode entry through the second connection interface 222 to the authentication device 204. In alternative embodiments, the transaction manager module 224 transmits the message through the network interface 238 to an external server system to verify the passcode entry. The logic circuitry 206 receives the message through the first connection interface 220 and extracts the cumulative encryption string 232 from the message. The logic circuitry 206 can implement a decryption module 240. The decryption module 240 is configured to decrypt data encrypted by the homomorphic cryptosystem implemented in the encryption module 230. For example, the decryption module 240 can access cryptography provision storage 242. The cryptography provision storage 242 can include a private key associated with the public key used by the encryption module 230. The cryptography provision storage 242 can include other parameters needed for decryption, such as the modulus N, the generator g, and the set of prime bases $p_i$.

The decryption module 240 determines an accumulated value indicative of the passcode entry by decrypting the cumulative encryption string 232. For example, the accumulated value can be a product of multiplying together encoded portions of the passcode entered by the user. The logic circuitry 206 can then use the accumulated value to verify against an authentic passcode. For example, the logic circuitry 206 can access the authentic passcode when the read head 208 detects the financial transaction card. A sequence of symbols representative of the passcode entry can be factored from the accumulated value using the set of prime numbers used to encode the symbols of the passcode. The logic circuitry 206 can then verify the determined passcode entry against the authentic passcode in either the financial transaction card (e.g., by sending the determined passcode entry to the financial transaction card) or the authentication device 104.

Alternatively, the logic circuitry 206 can calculate a comparison value based at least in part on the authentic passcode to compare against the accumulated value of the encoded portions representing the passcode entry. Based on the comparison, the logic circuitry 206 can either authorize or deny the financial transaction.

Regarding FIG. 1 and FIG. 2, blocks, components, and/or modules associated with the electronic device 102, the passcode verification system 110, the passcode entry device 202 and the authentication device 204, each may be implemented in the form of special-purpose circuitry, or in the form of one or more appropriately programmed programmable processors, or a combination thereof. For example, the modules described can be implemented as instructions on a tangible storage memory capable of being executed by a processor or a controller on a machine. The tangible storage memory may be volatile or non-volatile memory. In some embodiments, the volatile memory may be considered "non-transitory" in the sense that it is not a transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof. Caches, memory space, and storages described in the figures can be implemented with the tangible storage memory as well, including volatile or non-volatile memory.

Each of the modules may operate individually and independently of other modules. Some or all of the modules may be executed on the same host device or on separate devices. The separate devices can be coupled via a communication module to coordinate its operations via an interconnect or wirelessly. Some or all of the modules may be combined as one module.

A single module may also be divided into sub-modules, each sub-module performing separate method step or method steps of the single module. In some embodiments, the modules can share access to a memory space. One module may access data accessed by or transformed by another module. The modules may be considered "coupled" to one another if they share a physical connection or a virtual connection, directly or indirectly, allowing data accessed or modified from one module to be accessed in another module. In some embodiments, some or all of the modules can be upgraded or modified remotely. The electronic device 102, the passcode verification system 110, the passcode entry device 202, or the authentication device 204 may include additional, fewer, or different modules for various applications.

Figure 3:
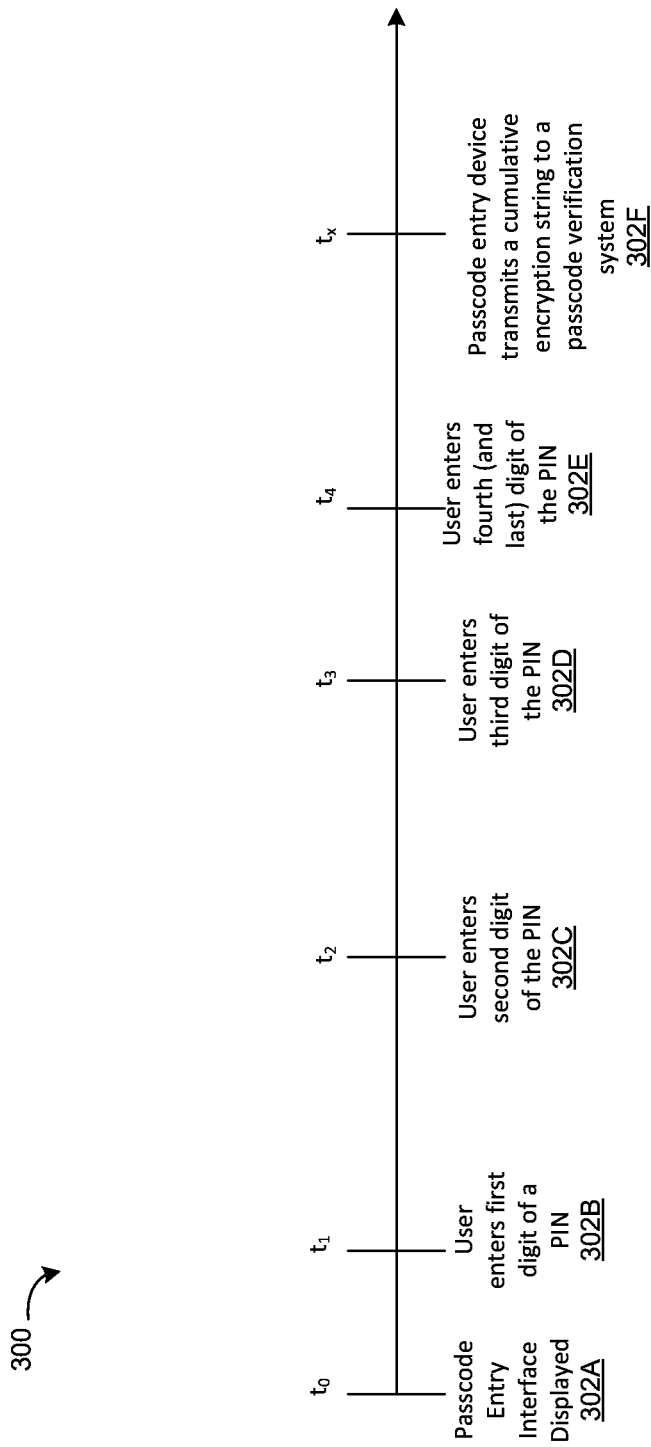
FIG. 3 is a diagram illustrating an example of a timeline for encrypting a sequence of symbols representing a passcode.

FIG. 3 is a diagram illustrating an example of a timeline 300 for encrypting a sequence of symbols representing a passcode. The disclosed technique involves piecemeal encryption of portions of the passcode. This technique minimizes the available time window during which an unencrypted passcode symbol, such as a PIN digit, is present (i.e., available on memory) on a passcode entry device, such as the electronic device 102 of FIG. 1 or the passcode entry device 202 of FIG. 2. The piecemeal encryption technique decouples the digits from each other.

Time tags 302A-F (collectively, "time tags 302") indicate events related to a user's entry of the sequence of symbols. For example, time tag 302A ("$t_0$") indicates when a passcode entry interface is provided on the passcode entry device. Time tags 302B-E ("$t_1$" to "$t_4$") indicate when the passcode entry device identifies/determines each symbol/digit of the passcode entry. For example, $t_1$ may correspond to when the first digit entered by the user is identified and $t_2$ may correspond to when the second digit is identified. Where the passcode entry device uses a touchscreen to display an interactive passcode entry interface, each of the time tags 302B-E may correspond with when a touch event is detected or when the passcode entry device determines which symbol corresponds to that touch event. Under the disclosed technique of passcode encryption, the passcode entry device can immediately or substantially immediately encrypt each of these symbols/digits after the symbol/digit is identified on the device.

One security consideration in designing a passcode entry system is whether a memory snapshot of the passcode entry device can compromise the passcode entered by the user. As shown, if memory were captured shortly after $t_i$, then the memory snapshot would reveal no information about the first digit through the $(i-1)^{th}$ digit of the passcode. The memory snapshot would also reveal no information about subsequent digits, such as $(i+1)^{th}$ digit through the last digit, of the passcode. In the example of using the ElGamal cryptosystem, once the per-digit secret/multiplier is deleted, the encryption is not reversible by any party who does not possess the private key. In the end, the passcode entry device can safely transmit the cumulative encryption to a passcode verification system at time tag 302F.

Figure 4:
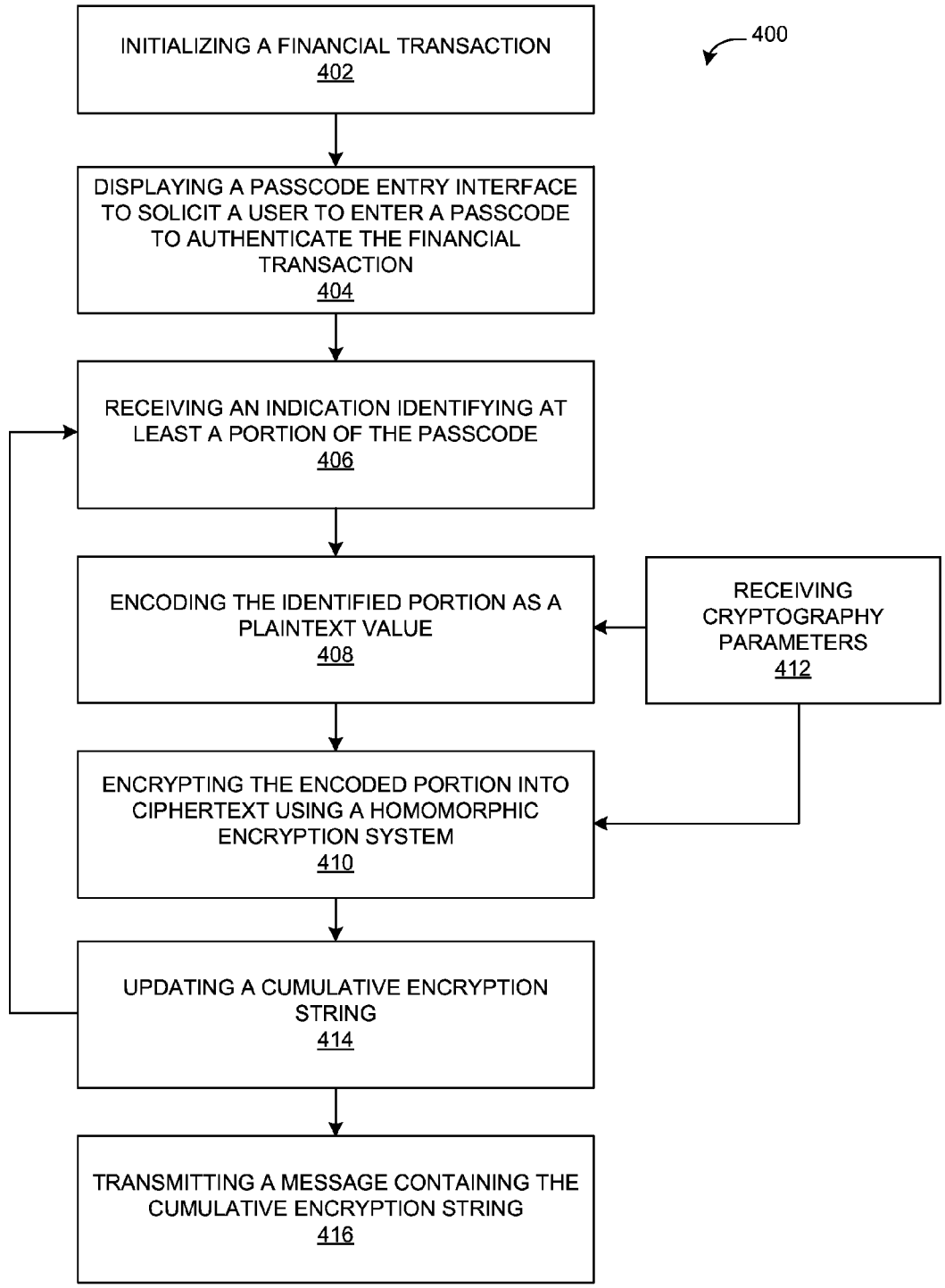
FIG. 4 is a flow chart of a process to encrypt a passcode using homomorphic cryptography.

FIG. 4 is flow chart of a process 400 to encrypt a passcode using homomorphic cryptography. The process 400 may be consistent with various other embodiments described in this disclosure. The process 400 performs a piecemeal encryption of the passcode in a cumulative manner. Step 402 includes an electronic device, such as the electronic device 102 of FIG. 1 or the passcode entry device 202 of FIG. 2, initializing a financial transaction (e.g., a payment transaction). Step 402 may include receiving card data from a card reader in response to the card reader detecting a financial transaction card. For example, the card reader may be the passcode verification device 110 of FIG. 1 or the authentication device 204 of FIG. 2.

The electronic device then displays a passcode entry interface to solicit a user to enter the passcode in step 404, where the passcode is used to authenticate the financial transaction. For example, the electronic device can display the passcode entry interface on a touchscreen. The passcode entry interface may include interactive elements labeled with symbols (e.g., characters, digits, icons, etc.) for composing the passcode.

Through the passcode entry interface, the electronic device receives an indication from the user identifying at least a portion of the passcode in step 406. For example, the indication can be a key entry corresponding to a symbol that is part of the passcode. Specifically, the indication can be a touch event on the touchscreen, where a location of the touch event corresponds to a label of the symbol on the passcode entry interface.

The electronic device can encode the identified portion as a plaintext value in step 408, prior to step 410 of encrypting the encoded portion. The identified portion, such as a symbol, can have a numeric representation ($d_i$), such as a number represented by binary bits. Here, "i" denotes the position of the symbol in the passcode. The encoding in step 408 may include selecting a prime number ($p_i$) from a set of small prime bases and calculating the prime number raised to the power equal to the numeric representation of the identified portion, i.e., $p_i^{d\_i}$. The prime number used to encode the identified portion can be selected based at least in part on the position of the portion in the passcode relative to other portions.

This set of small prime bases may be part of the cryptography parameters stored in the electronic device. The cryptography parameters may include an encryption key (e.g., a public encryption key), a generator g, a modulus N, the set of prime bases, or any combination thereof. The process 400 may include step 412 of receiving such cryptography parameters from an external source. The electronic device may receive at least a portion of the cryptography parameters directly or indirectly from the card reader. The electronic device may instead receive at least a portion of the cryptography parameters directly or indirectly from an external server system. For example, the electronic device may first retrieve a hardware ID of the card reader, and then query the external server system for cryptography parameters associated with the hardware ID. In some embodiments, the cryptography parameters may be retrieved from both the card reader and the external server system. This way, the electronic device has an opportunity to verify the parameters against each other. The cryptography parameters may also be encrypted and/or otherwise encoded with a verifiable signature. Upon receiving the cryptography parameters, the electronic device can verify these cryptography parameters using the verifiable signature, such as via a certificate authority. In alternative embodiments, at least a portion of the cryptography parameters is downloaded onto the electronic device when a mobile application implementing the process 400 is downloaded and installed onto the electronic device.

The prime numbers used for encoding in step 408 may be based on one or more of the cryptography parameters retrieved in step 412. For example, when encrypting using the ElGamal encryption mechanism, the prime numbers may satisfy the requirement that $p_i^q \equiv 1 \pmod{N}$. Here, N is the modulus chosen to perform the ElGamal encryption and q is a Sophie Germain prime associated with N such that N=2q+1. N and/or q may be part of the cryptography parameters accessible to the electronic device.

Step 410 includes the electronic device encrypting the encoded portion from step 408 or the identified portion from step 406 into ciphertext using a homomorphic encryption system, such as the encryption mechanism of the ElGamal cryptosystem or a variant thereof. The encryption may utilize the received cryptography parameters in step 412, including the encryption key.

Certain encryption mechanisms, including the El Gamal encryption mechanism, generate and use a random variable as part of the encryption to protect the confidentiality of the ciphertexts. It is noted that in step 410, the electronic device may generate the random variable by reading a pseudorandom stream using a non-buffering I/O call. A non-buffering I/O call can minimize exposure of the random variable in the memory buffer of the electronic device to avoid a third party from influencing or reading the random variable in order to extract information related to the passcode.

The electronic device updates a cumulative encryption string when the encryption finishes in step 414. If the encoded portion corresponds to the first portion of the passcode, step 414 sets the cumulative encryption string as the ciphertext for that portion. Otherwise, the cumulative encryption string is updated by executing a cumulative operation on the ciphertext based on the cumulative encryption string computed for a previous portion of the passcode. The homomorphic property of the homomorphic encryption system dictates which cumulative operation to execute. For example, where ElGamal encryption mechanism is used, the cumulative operation is a cumulative product (i.e., multiplying the ciphertexts together). That is, the cumulative encryption string can be set as a cumulative product of the ciphertext and all previous ciphertexts corresponding to all previously encrypted portions of the passcode.

Step 406, step 408, step 410, and step 414 are repeated until the cumulative encryption string "accumulates" every portion of the passcode. In step 416, the electronic device transmits a message containing the cumulative encryption string to a destination device to verify the passcode. For example, the destination device can be the card reader or an external server system.

Figure 5:
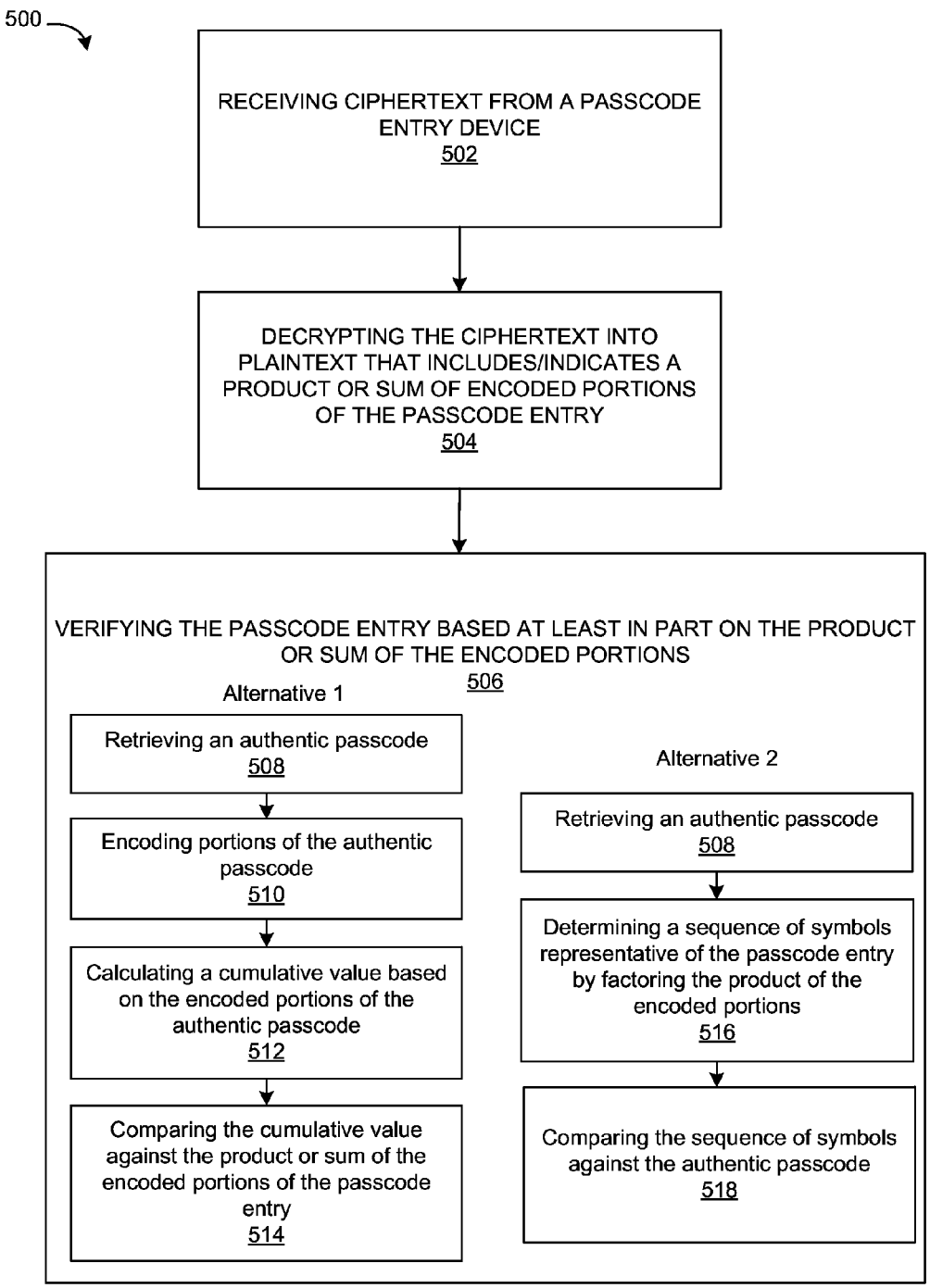
FIG. 5 is a flow chart of a process to authenticate a passcode entry based at least in part on an encrypted message.

FIG. 5 is a flow chart of a process 500 to authenticate a passcode entry based at least partly on an encrypted message. The process 500 may be consistent with various other embodiments described in this disclosure. The process 500 may be implemented by a passcode verification system, such as the passcode verification system 110 of FIG. 1 or the authentication device 204 of FIG. 2. Step 502 includes receiving ciphertext from a passcode entry device, such as the electronic device 102 of FIG. 1 or the passcode entry device 202 of FIG. 2. The passcode verification system can decrypt the ciphertext into plaintext in step 504. The decryption uses a decryption mechanism of a homomorphic cryptosystem, such as the ElGamal cryptosystem.

The plaintext is indicative of a product or a sum of encoded portions of the passcode entry. Each encoded portion represents a portion of the passcode entry and a position of the portion relative to other portions of the passcode entry. For example, the encoded portion may be indicative of a symbol that is part of the passcode. Subsequently, in step 506, the passcode verification system verifies the passcode entry based at least in part on the product or the sum of the encoded portions.

As a specific example, step 506 can include sub-step 508 to retrieve an authentic passcode. Where the passcode verification system is a card reader device, sub-step 508 includes retrieving the authentic passcode from a financial transaction card via a read head. In sub-step 510, the passcode verification system can encode portions of the authentic passcode in the same manner as how the encoded portions of the passcode entry are calculated on the passcode entry device. In sub-step 512, the passcode verification system can calculate a cumulative value through a cumulative operation on the encoded portions of the authentic passcode. The cumulative operation is dictated by the homomorphic property of the homomorphic cryptosystem. For example, where the homomorphic property preserves multiplication, the cumulative value is calculated as a cumulative product of the encoded portions of the authentic passcode. In sub-step 514, the passcode verification system can authenticate the passcode entry by comparing the cumulative value against the product or the sum of the encoded portions of the passcode entry.

As another specific example, after retrieving the authentic passcode in sub-step 508, the passcode verification system can determine a sequence of symbols representative of the passcode entry by factoring the product of the encoded portions in sub-step 516. The product may be factored using a set of prime numbers used to encode each portion. The passcode verification system can then compare the sequence against the authentic passcode in sub-step 518. In other embodiments, the passcode verification system sends the sequence to the financial transaction card for the financial transaction card to verify the sequence against the authentic passcode.

Figure 6:
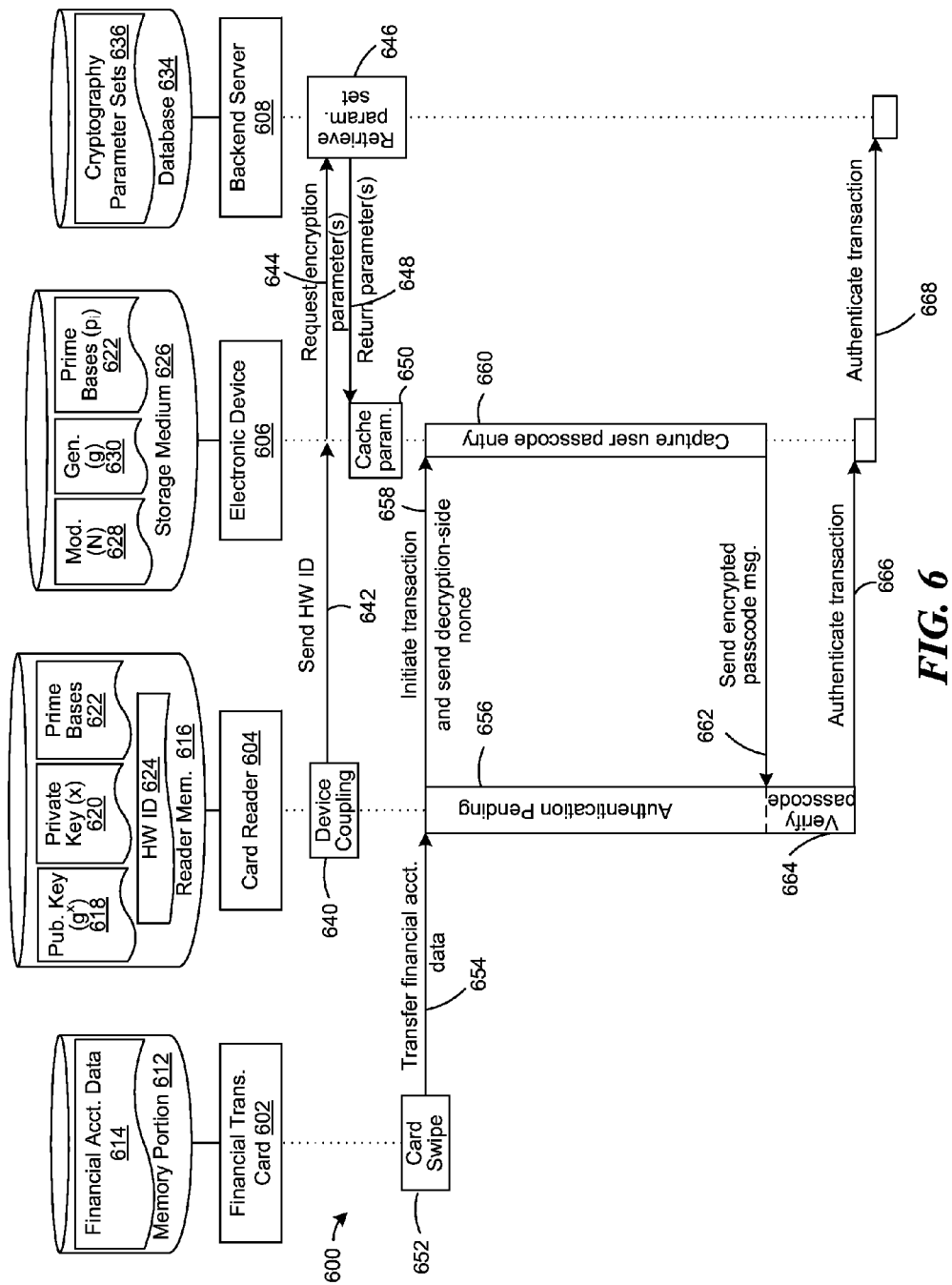
FIG. 6 is an activity diagram of a process to authenticate a financial transaction associated with a financial transaction card.

FIG. 6 is an activity diagram of a process 600 to authenticate a financial transaction associated with a financial transaction card 602. The process 600 involves the financial transaction card 602, a card reader 604 (e.g., the passcode verification system 110 of FIG. 1 or the authentication device 204 of FIG. 2), an electronic device 606 (e.g., the electronic device 102 of FIG. 1 or the passcode entry device 202 of FIG. 2), and a backend server 608 (together referred to as the "actors" of the process 600).

Each of these actors stores information that can facilitate the process 600 in a storage device, such as magnetic memory, electronic memory, mechanical memory, optical memory, or any combination thereof. The financial transaction card 602 may include a memory portion 612 storing financial account data 614 for a user of the financial transaction card 602. For example, the financial account data 614 may include a debit card number and/or an authentic PIN associated with the debit card number. The card reader 604 may include a reader memory 616 storing at least a public key 618 for encryption, a private key 620 for decryption, a prime bases set 622 for encoding passcode portions, and a hardware ID 624. These parameters in the reader memory 616 may be stored during factory provisioning of the card reader 604.

The electronic device 606 may include a storage medium 626 storing an encryption modulus 628, an encryption generator 630, and the prime bases set 622. These parameters in the storage medium 626 may be provisioned when a mobile application is downloaded and installed on the electronic device 606. Alternatively, some of these parameters may be requested from either the card reader 604 or the backend server 608.

The backend server 608 can include a database 634 storing cryptography parameter sets 636 respectively associated with particular hardware IDs, such as the hardware ID 624. One of the cryptography parameter sets 636 may be associated with the hardware ID 624 and may include the public key 618, the encryption modulus 628, the encryption generator 630, the prime bases set 622, or any combination thereof.

The process 600 may begin with the card reader 604 coupling with the electronic device 606 in step 640, such as by plugging a connector of the card reader 604 into an audio jack of the electronic device 606. Part of step 640 may include sending the hardware ID 624 to the electronic device 606 in sub-step 642. In response to receiving the hardware ID 624, the electronic device 606 may request, in step 644, public encryption parameters not available in the storage medium 626 from the backend server 608. For example, public encryption parameters not available in the storage medium 626 may include the public encryption key 618 associated with the hardware ID 624. The request includes the hardware ID 624 such that the backend server 608 can look up/retrieve, in step 646, the correct cryptography parameter set from the database 634. The backend server 608 returns the requested encryption parameters in step 648. In response, the electronic device 606 can store or cache, in step 650, the returned parameters and its association with the hardware ID 624 in the storage medium 626. The above steps in the process 600 may be performed independent of the financial transaction associated with the financial transaction card 602.

The financial transaction part of the process 600 begins with a user swiping the financial transaction card 602 (or otherwise causing the financial transaction card 602 to be detected by the card reader 604) in step 652. The term "swipe" or "swiping" here refers to any manner of triggering a card reader to read a card, such as passing a card through a magnetic stripe, NFC smart card reader, smartcard reader, optical code reader, radio frequency identification (RFID) reader, etc. In response, the financial account data 614 is transferred over to the card reader 604 in step 654. The transference of the financial account data 614 can initiate an authentication step 656 on the card reader 604. For example, the authentication step 656 may begin with initiating the financial transaction with the electronic device 606 in step 658. Step 658 may include sending a decryption-side nonce to the electronic device 606. In response to receiving a message to initiate the financial transaction, the electronic device 606 can begin to capture user passcode entry in step 660. For example, step 660 may include generating and displaying a passcode entry interface on a touchscreen of the electronic device 606. As another example, step 660 may include monitoring for key presses on a keypad coupled to the electronic device 606. Step 660 also includes a process of "cumulatively" encrypting each portion (e.g., digit or symbol) of the passcode as the portion is entered by the user, such as the process described by steps 406, 408, 410, and 414 of FIG. 4 or the process 700 described below. Once the electronic device 606 calculates a cumulative encryption string representative of the entire passcode entry by the user, the electronic device 606 sends, in step 662, an encrypted passcode message to the card reader 604 for decryption and verification. Alternatively, the electronic device 606 can instead send the encrypted passcode message to an external computer system, such as the backend server 608, to verify the passcode entry.

The card reader 604 verifies the passcode message in step 644. Step 644 includes decrypting the message utilizing the private key 620 and the public encryption parameters (e.g., the encryption modulus 628, the encryption generator 630, and the prime bases 622) to extract at least a cumulative product representing encoded portions of the passcode entry. The cumulative product can be factored using the prime bases set 622 to determine a sequence of symbols/digits representative of the passcode entry. The card reader 604 verifies the sequence of symbols/digits against the authentic passcode associated with the financial account data 614. Step 644 also includes verifying the authenticity and data integrity of the passcode message based at least in part on the decryption-side nonce generated and transmitted in step 658. The process 800 of FIG. 8 further elaborates on this process.

Upon verifying the passcode message, the card reader 604 can transmit, in step 666, a message to notify the electronic device 606 that the financial transaction has been authenticated. In turn, the electronic device 606 can notify, in step 668, the backend server 608 and/or computer servers of financial institutions that the financial transaction is authenticated.

Figure 7:
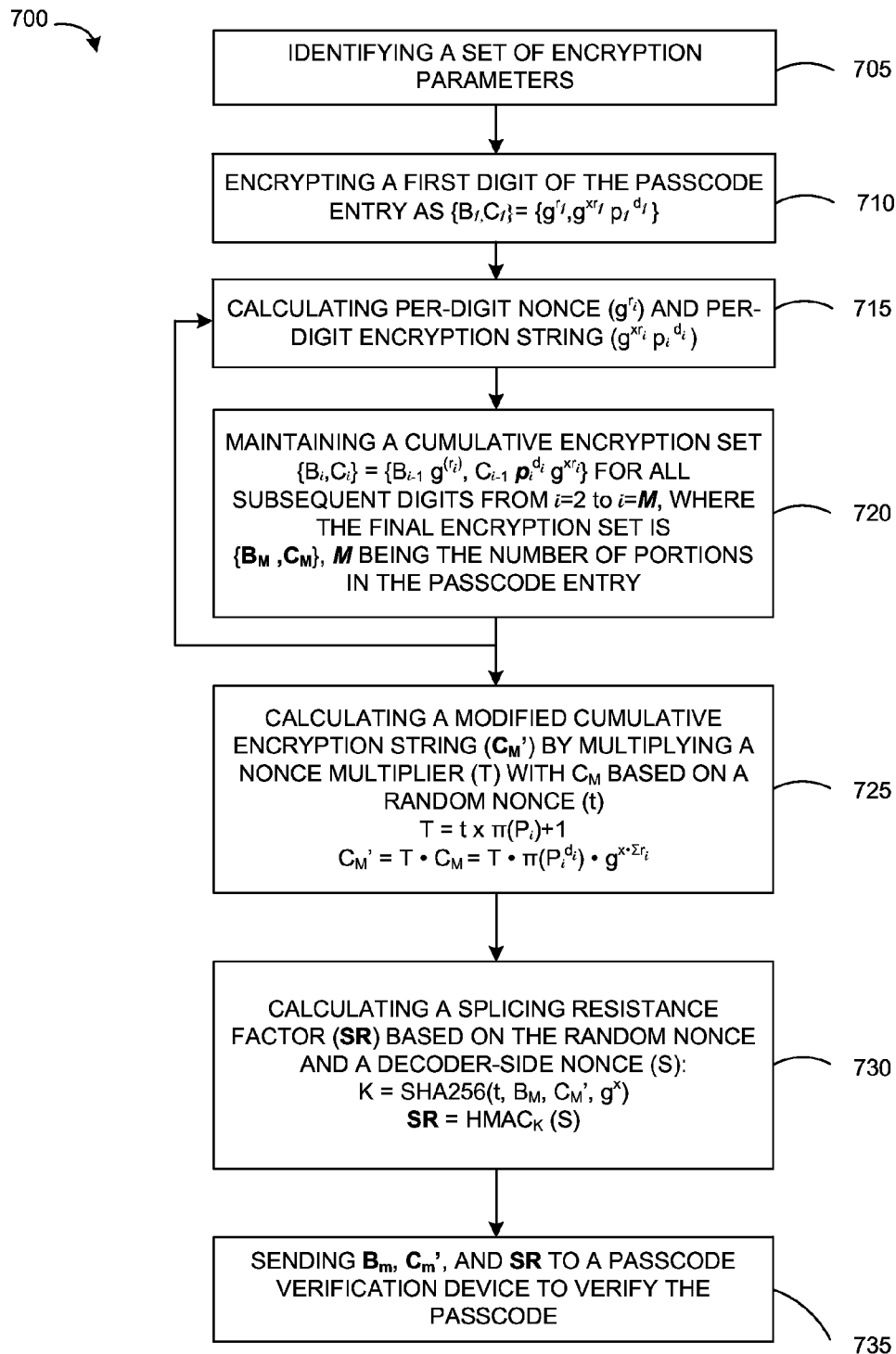
FIG. 7 is a flow chart of a detailed embodiment of a process to encrypt a passcode digit-by-digit using homomorphic cryptography

FIG. 7 is flow chart of a detailed embodiment of a process 700 to encrypt a passcode digit-by-digit using homomorphic cryptography. The process 700 can be consistent with various embodiments, such as the process 400 of FIG. 4. The process 700 can also apply to encrypting the passcode symbol by symbol or portion by portion, as long as each symbol or portion has a numeric representation. The process 700 can be implemented by an electronic device, such as the electronic device 102 of FIG. 1, the passcode entry device 202 of FIG. 2, or the electronic device 606 of FIG. 6.

The process 700 begins in step 705 with identifying a set of encryption parameters including an encryption generator (g), an encryption modulus (N), a public key ($g^x$), and a set of prime bases ($p_i$). Then in step 710, the electronic device can encrypt a first digit ($d_1$) of the passcode by calculating a per-digit nonce ($B_1$) and a per-digit encryption string ($C_1$). For the first digit of the passcode, a first random number ($r_1$) is generated, such as by making a random number request via a non-buffering I/O call to a pseudorandom stream accessible to an operating system of the electronic device. The per-digit nonce is calculated by raising the encryption generator to the power of the first random number. The per-digit encryption string is calculated by raising a first prime number in the set of prime bases to the power of the first digit and multiplying the result with the public key raised to the power of the first random number. Step 710 may also include deleting the first random number after the per-digit nonce and the per-digit encryption string are calculated.

$$B_1 = g^{r_1} \quad \text{Eq. 1}$$

$$C_1 = g^{x \cdot r_1} \cdot p_i^{d_1} \quad \text{Eq. 2}$$

The electronic device calculates a per-digit nonce and a per-digit encryption string for every subsequent digit of the passcode in step 715. For example, the per-digit nonce is calculated by raising the encryption generator to the power of a new random number. The per-digit encryption string is calculated by selecting a prime number from the set of prime bases based on the position of the digit in the passcode; raising the selected prime number to the power of the digit; and multiplying the result with the public key raised to the power of the new random number.

The electronic device maintains a cumulative encryption set for every subsequent digit in step 720. The electronic device calculates a cumulative nonce portion by taking the product of all per-digit nonces previously calculated. The electronic device also calculates a cumulative encryption string portion by taking the product of all per-digit encryption string previously calculated. The electronic device can repeat step 715 and step 720 until all digits of the passcode are processed into the cumulative encryption set. The final encryption set $\{B_M, C_M\}$, M being the number of digits in the passcode, is a tuple including the product of every per-digit nonce and the product of every per-digit encryption string.

$$B_i = B_{i-1} \cdot g^{r_j} \quad \text{Eq. 3}$$

$$C_i = C_{i-1} \cdot g^{x \cdot r_i} \cdot p_i^{d_i} \quad \text{Eq. 4}$$

$$B_M = g^{\Sigma r_i} \quad \text{Eq. 5}$$

$$C_M = g^{x \cdot \Sigma r_i} \cdot \pi(p_i^{d_j}) \quad \text{Eq. 6}$$

After all digits are processed, the electronic device calculates, in step 725, a modified cumulative encryption string ($C_M'$) by multiplying a nonce multiplier (T) with the cumulative encryption string ($C_M$). The nonce multiplier can be calculated based on an encryption-side random nonce (t) generated by the electronic device. For example, the nonce multiplier is calculated as one plus a product of the encryption-side random nonce and a product of all of the prime numbers in the prime bases set.

$$T = t \times \pi_i(p_i) + 1 \quad \text{Eq. 7}$$

$$C_M' = T \cdot C_M = T \cdot \pi(p_i^{d_i}) \cdot g^{x \cdot \Sigma r_i} \quad \text{Eq. 8}$$

The electronic device also calculates, in step 730, a splicing resistance factor (SR) based at least in part on the encryption-side random nonce (t) and a decryption-side nonce (S). The splicing resistance factor is a message authentication code that can be used to verify data integrity and authenticity of an encrypted message including the cumulative encryption string. For example, the electronic device can calculate the splicing resistant factor as a keyed-hash message authentication code using HMAC based at least partly on a SHA256 hash function key and the decryption-side nonce. The SHA256 hash function key can be generated based on the encryption-side random nonce, the cumulative nonce, the modified cumulative encryption string, and the public key.

$$K = \text{SHA256}(t, B_M, C_M', g^x) \quad \text{Eq. 9}$$

$$SR = \text{HMAC}_K(S) \quad \text{Eq. 10}$$

SHA256 is a cryptographic hash function. $\text{HMAC}_K$ is a function to generate a message authentication code utilizing a secret cryptographic key (K). The message authentication code may be used to simultaneously verify both the data integrity and the authentication of a message.

After the electronic device computes $B_M$, $C_M$, and SR, the electronic device sends a message containing all three values to a passcode verification device in step 735. For example, the passcode verification device can be the passcode verification device 110 of FIG. 1, the authentication device 204 of FIG. 2, or the card reader 604 of FIG. 6.

Figure 8:
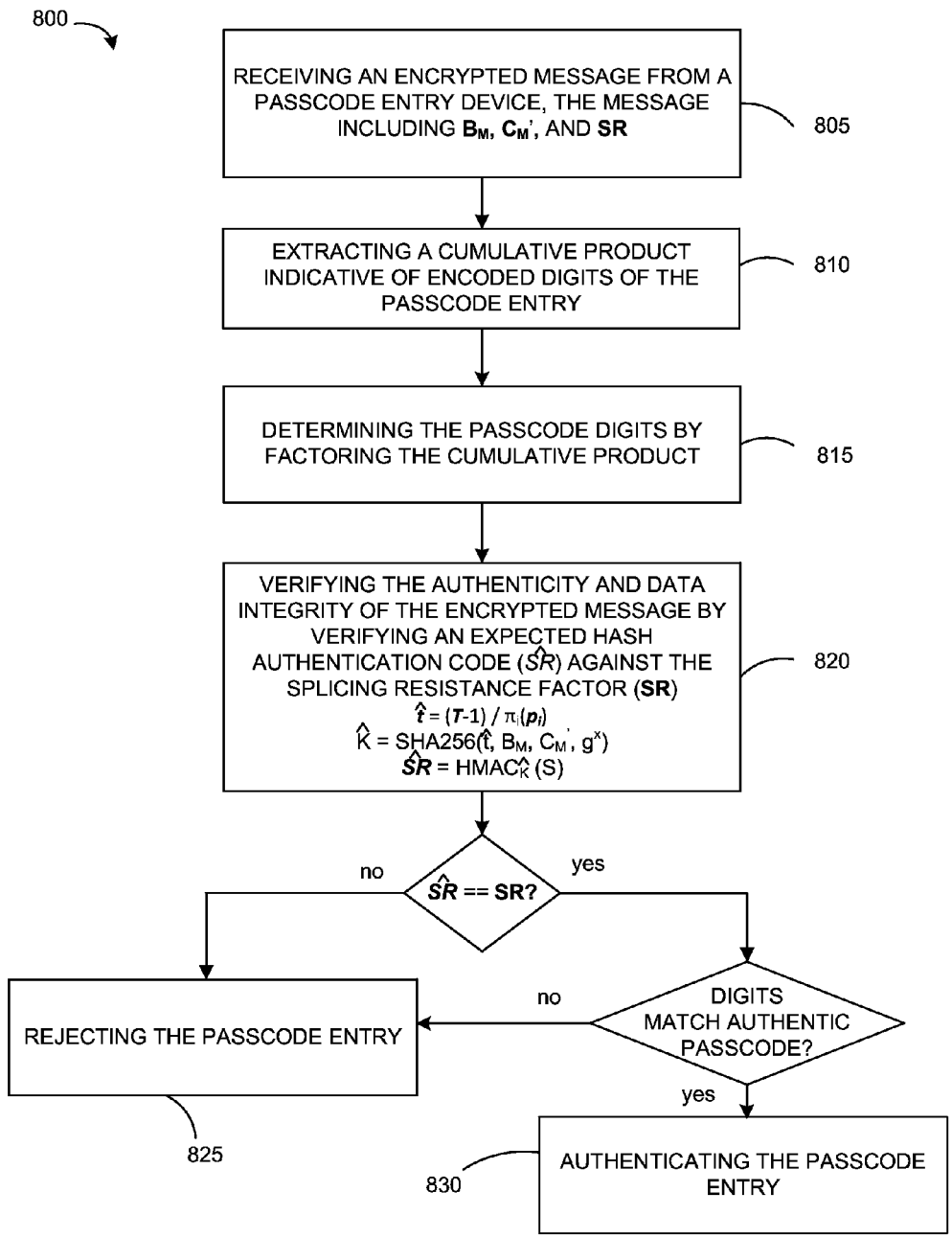
FIG. 8 is a flow chart of a detailed embodiment of a process to authenticate a passcode entry based at least in part on an encrypted message.

FIG. 8 is a flow chart of a detailed embodiment of a process 800 to authenticate a passcode entry based at least in part on an encrypted message. The process 800 can be consistent with various embodiments, such as the process 500 of FIG. 5. The process 800 can be implemented by a passcode verification device, such as the passcode verification device 110 of FIG. 1, the authentication device 204 of FIG. 2, or the card reader 604 of FIG. 6. To perform the process 800, the passcode verification device would have access to both the private key (x) and the public encryption parameters, such as the encryption generator (g), the encryption modulus (N), and the set of prime bases ($p_i$). The passcode verification device would also have access to a decryption-side nonce (S) used as part of the encryption process of the encrypted message.

The process 800 begins with receiving an encrypted message from a passcode entry device in step 805. The encrypted message includes at least the data strings $B_M$, $C_M'$, and SR as discussed in the process 700 of FIG. 7. The passcode verification device then extracts a cumulative product indicative of encoded digits from the cumulative encryption string $C_M'$ in step 810. For example, this can be accomplished by dividing the cumulative product by the cumulative nonce ($B_M$) raised to the power of the private key (x). As discussed in FIG. 7, the cumulative product is a product of a nonce multiplier and the product of the encoded digits.

$$T \cdot \pi(p_i^{d_i}) = C_M'/(B_M)^x = C_M' \cdot (B_M)^x \qquad \text{Eq. 11}$$

The passcode verification device can then determine the passcode digits by factoring the cumulative product in step 815. For example, the passcode verification device can perform prime bases factorization on the cumulative product using the set of prime bases known to the passcode verification device.

After determining the passcode digits, the passcode verification device can verify the authenticity and data integrity of the encrypted message by verifying against the splicing resistant factor (SR) in step 820. The splicing resistant factor may be a message authentication code. An encryption-side nonce (t) encoded in the nonce multiplier may be part of the key to verify the message authentication code. Accordingly, the passcode verification device can solve for the numeric value of the nonce multiplier once the passcode digits are determined. In accordance with step 725 and Equation 7, the encryption-side nonce is solved by Equation 12 below.

$$t = (T-1)/\pi_i(p_i) \qquad \text{Eq. 12}$$

The passcode verification device then verifies whether the message authentication code represented by the splicing resistant factor is authentic. This can be accomplished by calculating an expected hash code in a similar fashion as step 730 according to Equations 9 and 10. Utilizing the determined encryption-side nonce (t), the public key ($g^x$), $B_M$, $C_M'$, and the decryption-side nonce (S), the passcode verification device calculates the expected hash code and compares that against the splicing resistant factor. If the two values do not match, the passcode verification device rejects and denies the passcode entry in step 825. If the expected hash code and the splicing resistant factor do match, and the determined passcode digits match the authentic passcode (e.g., when the determined passcode digits are approved by the financial transaction card), the passcode verification device accepts and authenticates the passcode entry in step 830.

While processes or blocks are presented in a given order in FIGS. 4 to 8, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 9:
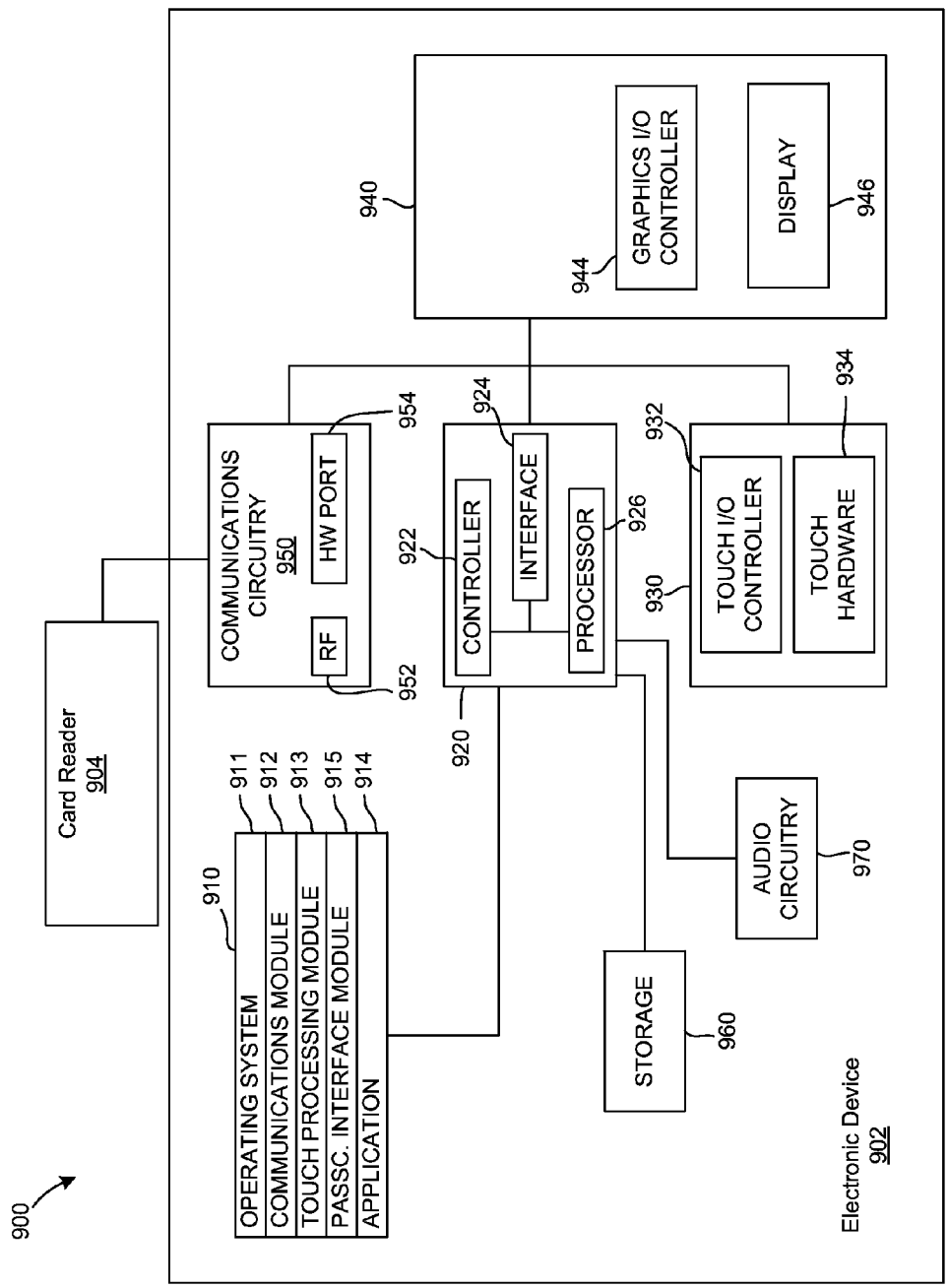
FIG. 9 is a block diagram of an example of a financial transaction system including an electronic device and a card reader.

FIG. 9 is a block diagram of an example of a financial transaction system 900 including an electronic device 902 (e.g., the electronic device 102 of FIG. 1 or the passcode entry device 202 of FIG. 2) and a card reader 904 (e.g., the passcode verification system 110 of FIG. 1 or the authentication device 204 of FIG. 2). Note that the architecture shown in FIG. 9 is only one example architecture of the financial transaction system 900, and that the electronic device 902 can have more or fewer components than shown, or a different configuration of components. The various components shown in FIG. 9 can be implemented by using hardware, software, firmware or a combination thereof, including one or more signal processing and/or application specific integrated circuits.

The electronic device 902 that can include one or more computer-readable mediums 910, processing system 920, touch subsystem 930, display/graphics subsystem 940, communications circuitry 950, storage 960, and audio circuitry 970. These components may be coupled by one or more communication buses or other signal lines.

The communications circuitry 950 can include RF circuitry 952 and/or port 954 for sending and receiving information. The RF circuitry 952 permits transmission of information over a wireless link or network to one or more other devices and includes well-known circuitry for performing this function. The port 954 permits transmission of information over a wired link. The communications circuitry 950 can communicate, for example, with the card reader 904. Alternatively, the card reader 904 may be connected through the audio circuitry 970. The communications circuitry 950 can be coupled to the processing system 920 via a peripherals interface 924. The peripherals interface 924 can include various known components for establishing and maintaining communication between peripherals and the processing system 920.

The audio circuitry 970 can be coupled to an audio speaker (not shown), a microphone (not shown), the card reader 904, or any combination thereof and includes known circuitry for processing signals received from the peripherals interface 924 to enable a user to communicate in real-time with other users or system(s). In some embodiments, the audio circuitry 970 includes a headphone jack (not shown).

The peripherals interface 924 can couple with various peripherals, such as the card reader 904, of the system to one or more processors 926 and the computer-readable medium 910. The one or more processors 926 can communicate with one or more computer-readable mediums 910 via a controller 922. The computer-readable medium 910 can be any device or medium that can store code and/or data for use by the one or more processors 926. The medium 910 can include a memory hierarchy, including but not limited to cache, main memory, and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). The medium 910 may also include a transmission medium for carrying information-bearing signals indicative of computer instructions or data (with or without a carrier wave upon which the signals are modulated). For example, the transmission medium may include a communications network, including but not limited to the Internet, intranet(s), Local Area Networks (LANs), Wide Local Area Networks (WLANs), Storage Area Networks (SANs), Metropolitan Area Networks (MAN) and the like.

The one or more processors 926 can run various software components stored in the medium 910 to perform various functions for the electronic device 902. Note that the order of the modules in the medium 910 does not denote the order of a software stack as implemented in the medium 910. In some embodiments, the software components include an operating system 911, a communication module (or set of instructions) 912, a touch processing module (or set of instructions) 913, a passcode interface module (or set of instructions) 915, such as the passcode interface module 226 of FIG. 2, and one or more applications (or set of instructions) 918, for example, including one or more of the modules described in the electronic device 102 and/or the passcode entry device 202. Each of these modules and above noted applications correspond to a set of instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. In some embodiments, the medium 910 may store a subset of the modules and data structures identified above. Furthermore, the medium 910 may store additional modules and data structures not described above.

The operating system 911 can include various procedures, sets of instructions, software components, and/or drivers for controlling and managing general system tasks (e.g., memory management, storage device control, power management, etc.) and facilitates communication between various hardware and software components.

The communication module 912 facilitates communication with other devices using the communications circuitry 950 and includes various software components for handling data received from the RF circuitry 952 and/or the port 954.

The touch-processing module 913 includes various software components for performing various tasks associated with touch hardware 934 including but not limited to receiving and processing touch input received from the I/O device 930 via a touch I/O device controller 932. For example, the touch-processing module 913 can also include software components for performing tasks associated with other I/O devices (not shown).

The passcode interface module 915 is configured to present and maintain a passcode interface for a user to enter a passcode to authenticate the user's identity. The passcode interface module 915 can include various known software components for rendering, animating and displaying graphical objects on a display surface. In embodiments, in which the touch hardware 934 is a touch sensitive display (e.g., touch screen), the passcode interface module 915 includes components for rendering, displaying, and animating objects on the touch sensitive display. The passcode interface module 915 can provide graphics instructions (e.g., animation or still image) to graphics I/O controller 944, so that the graphics I/O controller 944 can display the graphics on display 946. The passcode interface module 915 can further control the audio circuitry 970 to provide an auditory component to the passcode interface.

One or more applications 918 can include any applications installed on the electronic device 902, including without limitation, modules of the electronic device 102 and/or the passcode entry device 202, a browser, keyboard emulation, widgets, JAVA-enabled applications, encryption, digital rights management, voice recognition, voice replication, location determination capability (such as that provided by the global positioning system (GPS)), etc.

The touch I/O controller 932 is coupled to the touch hardware 934 for controlling or performing various functions. The touch hardware 934 communicates with the processing system 920 via the touch I/O device controller 932, which includes various components for processing user touch input (e.g., scanning hardware). One or more other input controllers (not shown) receives/sends electrical signals from/to other I/O devices (not shown). Other I/O devices may include physical buttons, dials, slider switches, sticks, keyboards, touch pads, additional display screens, or any combination thereof.

If embodied as a touch screen, the touch hardware 934 displays visual output to the user in a GUI. The visual output may include text, graphics, video, and any combination thereof. Some or all of the visual output may correspond to user-interface objects. The touch hardware 934 forms a touch-sensitive surface that accepts touch input from the user. The touch hardware 934 and the touch controller 932 (along with any associated modules and/or sets of instructions in the medium 910) detects and tracks touches or near touches (and any movement or release of the touch) on the touch hardware 934 and converts the detected touch input into interaction with graphical objects, such as one or more user-interface objects. In the case in which the touch hardware 934 and the display 946 are embodied as a touch screen, the user can directly interact with graphical objects that are displayed on the touch screen. Alternatively, in the case in which touch hardware 934 is embodied as a touch device other than a touch screen (e.g., a touch pad), the user may indirectly interact with graphical objects that are displayed on a separate display screen. In some embodiments, the touch controller 932 may be configured such that it is disabled when a passcode interface is being displayed by the display 946.

Embodiments in which the touch hardware 934 is a touch screen, the touch screen may use LCD (liquid crystal display) technology, LPD (light emitting polymer display) technology, OLED (organic light emitting diode), or OEL (organic electro luminescence), although other display technologies may be used in other embodiments.

In some embodiments, the peripherals interface 924, the one or more processors 926, and the memory controller 922 may be implemented on a single chip. In some other embodiments, they may be implemented on separate chips. The storage 960 can be any suitable medium for storing data, including, for example, volatile memory (e.g., cache, RAM), non-volatile memory (e.g., Flash, hard-disk drive), or a combination of both for storing data.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

What is claimed is:

1. A method of safeguarding passcode entry on a mobile device, the method comprising:
    detecting, by the mobile device, a swipe of a financial transaction card at a card reader attached to the mobile device;
    initializing, by the mobile device, a financial transaction and receiving card data from the card reader attached to the mobile device;
    receiving, by the mobile device, a decryption-side nonce associated with the card reader;
    displaying, by the mobile device, a passcode entry interface on a touchscreen of the mobile device, wherein the passcode entry interface enables a user to enter a passcode;
    receiving, by the mobile device, the passcode entered by the user;
    determining, by the mobile device, a sequence of digits corresponding to the received passcode;
    encoding, by the mobile device, each of the determined sequence of digits into an encoded digit;
    encrypting, by the mobile device, the encoded digit into ciphertext using homomorphic cryptography;
    maintaining, by the mobile device, a cumulative product based at least partly on the ciphertexts associated with the determined sequence of digits;
    generating, by the mobile device, an encryption-side nonce;
    generating, by the mobile device, a message authentication code based at least in part on the cumulative product, the encryption-side nonce, and the decryption-side nonce; and
    transmitting, by the mobile device, an encrypted message including the message authentication code, wherein transmitting the encrypted message causes a process to authenticate the financial transaction to initiate, wherein the encrypted message represents the passcode entered by the user.

2. The method of claim 1, wherein maintaining the cumulative product includes multiplying the ciphertext corresponding to a newly entered digit with the cumulative product calculated for all previous digits in the sequence.

3. The method of claim 1, wherein encoding each digit and encrypting each encoded digit are performed after determining the digit entered by the user; and wherein maintaining the cumulative product includes updating the cumulative product in response to encrypting each encoded digit.

4. The method of claim 1, wherein generating the message authentication code is based partly on a cryptographic hash function.

5. The method of claim 1, wherein encoding the digit comprises:
    calculating the encoded digit as a prime number raised to the power of the digit; and selecting the prime number from a set of prime bases based at least partly on the position of the digit in the sequence of digits.

6. The method of claim 1, wherein generating the message authentication code includes executing a hashed message authentication code (HMAC) operation with a pre-hashed string as a secret cryptographic key.

7. The method of claim 6, wherein generating the message authentication code includes computing the pre-hashed string by running the cryptographic hash function on at least the encryption-side nonce and the cumulative encryption string.

8. The method of claim 1, wherein the cryptographic hash function is in accordance with SHA-256 or a variant thereof.

9. The method of claim 1, wherein encoding the digit comprises: selecting, based on a sequential position ("i") of the digit relative to other digits of the passcode, a prime number ("pi") from a set of prime number bases; and computing the encoded digit as the selected prime number raised to the power of the digit.

* * * * *